United States Patent
Manabe et al.

(10) Patent No.: US 11,150,125 B2
(45) Date of Patent: Oct. 19, 2021

(54) METHOD FOR PRODUCING REMAINING FUEL DETECTION DEVICE AND FUEL SUPPLY MODULE

(71) Applicant: AISAN KOGYO KABUSHIKI KAISHA, Obu (JP)

(72) Inventors: Yuichi Manabe, Inazawa (JP); Nobuo Suzuki, Obu (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 151 days.

(21) Appl. No.: 16/619,399

(22) PCT Filed: Mar. 28, 2018

(86) PCT No.: PCT/JP2018/012993
§ 371 (c)(1),
(2) Date: Dec. 4, 2019

(87) PCT Pub. No.: WO2018/225349
PCT Pub. Date: Dec. 13, 2018

(65) Prior Publication Data
US 2020/0182681 A1    Jun. 11, 2020

(30) Foreign Application Priority Data
Jun. 7, 2017 (JP) .............................. JP2017-112668

(51) Int. Cl.
*G01F 25/00* (2006.01)
*G01F 23/38* (2006.01)

(52) U.S. Cl.
CPC .......... *G01F 25/0069* (2013.01); *G01F 23/38* (2013.01)

(58) Field of Classification Search
CPC ... G01F 25/0069; G01F 23/38; G01F 25/0084
(Continued)

(56) References Cited

U.S. PATENT DOCUMENTS

| 7,222,530 B2 | 5/2007 | Fukuhara et al. |
| 7,342,395 B2 | 3/2008 | Thomas et al. |

(Continued)

FOREIGN PATENT DOCUMENTS

| JP | H9-33323 A | 2/1997 |
| JP | H9-138252 A | 5/1997 |

(Continued)

OTHER PUBLICATIONS

Written Opinion of the International Searching Authority for PCT/JP2018/012993 dated Jun. 12, 2018 (10 pages including English translation).

(Continued)

*Primary Examiner* — Robert R Raevis
(74) *Attorney, Agent, or Firm* — Shumaker, Loop & Kendrick, LLP

(57) ABSTRACT

A fuel remaining amount detector may include an arm supported rotatably to a body; an angle sensor configured to output first data in accordance with a relative angle between the body and the arm; a storage circuit configured to store conversion data; and a data conversion circuit configured to convert the first data to second data based on the conversion data. A manufacturing method of the fuel remaining amount detector may include creating the conversion data by performing processing for each of at least three predetermined angles, in which the processing includes: measuring the first data outputted by the angle sensor with the relative angle set to one of the predetermined angles; and storing a value corresponding to the one of the predetermined angles in the storage circuit as a value of the second data in association with the value of the measured first data.

2 Claims, 5 Drawing Sheets

(58) Field of Classification Search
USPC ............ 73/1.73, 149, 317–322; 702/86, 104, 702/156; 701/123
See application file for complete search history.

(56) References Cited

U.S. PATENT DOCUMENTS

| | | | |
|---|---|---|---|
| 7,490,515 | B2 | 2/2009 | Tanaka et al. |
| 8,377,694 | B2 | 2/2013 | Rajagopalan et al. |
| 8,881,765 | B2 | 11/2014 | Okazono et al. |
| 2006/0137429 | A1* | 6/2006 | Henschel ............ G01F 25/0061 73/1.73 |
| 2008/0295569 | A1 | 12/2008 | Lundstrom |
| 2012/0232777 | A1* | 9/2012 | Elkaim .................. G07C 5/004 701/123 |
| 2015/0114100 | A1 | 4/2015 | Ikeya et al. |
| 2018/0143065 | A1* | 5/2018 | Klimesch ............ G01F 25/0069 |

FOREIGN PATENT DOCUMENTS

| | | |
|---|---|---|
| JP | 2001-165603 A | 6/2001 |
| JP | 2004-184179 A | 7/2004 |
| JP | 2005-274434 A | 10/2005 |
| JP | 2005-291942 A | 10/2005 |
| JP | 2005-321263 A | 11/2005 |
| JP | 2006-242777 A | 9/2006 |
| JP | 2007-304000 A | 11/2007 |
| JP | 2007-535661 A | 12/2007 |
| JP | 2011-080991 A | 4/2011 |
| JP | 2012-082816 A | 4/2012 |
| JP | 2015-087248 A | 5/2015 |
| JP | 2016-061708 A | 4/2016 |

OTHER PUBLICATIONS

International Search Report (ISR) for PCT/JP2018/012993 dated Jun. 12, 2018 (4 pages total including English translation).
Japanese Office Action (OA) for JP Pat. App. 2017-112668 dated Aug. 3, 2021 (12 pages).

* cited by examiner

| Primary Data $\theta_1$ [arb. unit] | Secondary Data $H_1$ ($\propto H_0$) [arb. unit] |
|---|---|
| -22 | 0.0 |
| -14 | 2.5 |
| 0 | 5.1 |
| 14 | 7.7 |
| 21 | 10.3 |
| 27 | 12.6 |
| 37 | 14.8 |
| 53 | 16.6 |
| 62 | 18.1 |

FIG. 6

| Actual Height $H_0$ ($\propto \sin(\theta_0)$) [cm] | Actual Angle $\theta_0$ [degrees] | Primary Data $\theta_1$ [arb. unit] | Secondary Data $H_1$ ($\propto H_0$) [arb. unit] |
|---|---|---|---|
| 0.0 | -20 | -22 | 0.0 |
| 2.5 | -10 | -14 | 2.5 |
| 5.1 | 0 | 0 | 5.1 |
| 7.7 | 10 | 14 | 7.7 |
| 10.3 | 20 | 21 | 10.3 |
| 12.6 | 30 | 27 | 12.6 |
| 14.8 | 40 | 37 | 14.8 |
| 16.6 | 50 | 53 | 16.6 |
| 18.1 | 60 | 62 | 18.1 |

FIG. 7

| Actual Angle $\theta_0$ [degrees] | Primary Data $\theta_1$ [arb. unit] | Secondary Data $\theta_2$ ($\propto \theta_0$) [arb. unit] |
|---|---|---|
| -20 | -22 | -20 |
| -10 | -14 | -10 |
| 0 | 0 | 0 |
| 10 | 14 | 10 |
| 20 | 21 | 20 |
| 30 | 27 | 30 |
| 40 | 37 | 40 |
| 50 | 53 | 50 |
| 60 | 62 | 60 |

METHOD FOR PRODUCING REMAINING FUEL DETECTION DEVICE AND FUEL SUPPLY MODULE

TECHNICAL FIELD

The art disclosed herein relates to a fuel remaining amount detector and a manufacturing method of a fuel supply module.

BACKGROUND ART

Japanese Patent Application Publication No. 2005-274434 describes a fuel remaining amount detector configured to detect a remaining amount of fuel in a fuel tank. The fuel remaining amount detector includes a body, an arm rotatably supported with respect to the body, and a float connected to the arm. The float floats on fuel in the fuel tank. When a liquid level of the fuel in the fuel tank changes, a position of the float in a vertical direction changes accordingly, and the arm rotates with respect to the body. An angle sensor (Hall IC) is installed inside the body. The angle sensor outputs data indicating a relative angle between the body and the arm. Therefore, the remaining amount of fuel in the fuel tank can be calculated based on the data outputted by the angle sensor.

SUMMARY OF INVENTION

Detection errors may occur in the angle sensor. For example, there may be a case where, when a rotation center axis of the arm and an axis of the angle sensor are offset from each other due to a manufacturing error or the like, a discrepancy occurs between data (data indicating the angle of the arm) outputted by the angle sensor and an actual angle of the arm. FIG. 5 illustrates a relationship between data $\theta_1$ outputted by the angle sensor and an actual angle $\theta_0$ of the arm. A solid line graph in FIG. 5 shows a design value (which is a predicted value that is theoretically supposed to be outputted), and a broken line graph in FIG. 5 shows a value of a specific angle sensor. A difference between the solid line graph and the broken line graph is the detection error. As shown in FIG. 5, a magnitude of the detection error varies depending on the angle $\theta_0$ of the arm. In addition, the detection error of the angle sensor is different between the respective fuel remaining amount detectors, even when they are of a same type of fuel amount detectors. Conventionally, such a detection error cannot be corrected, and its detection accuracy of the remaining amount of fuel had not been very high. The present disclosure provides art configured capable of improving a detection accuracy of a fuel remaining amount detector.

With a manufacturing method disclosed herein, a fuel remaining amount detector configured to detect a remaining amount of fuel in a fuel tank is manufactured. The fuel amount detector manufactured by this method may comprise: a body; an arm supported rotatably to the body; a float connected to the arm; an angle sensor configured to output first data in accordance with a relative angle between the body and the arm; a storage circuit configured to store conversion data which describes each value of second data in association with a value of the first data; and a data conversion circuit configured to receive the first data from the angle sensor, convert the first data received from the angle sensor to the second data based on the conversion data, and output the converted second data. The method may comprise creating the conversion data by performing processing for each of at least three predetermined angles. The processing may include: measuring a value of the first data outputted by the angle sensor with the relative angle set to one of the at least three predetermined angles; and storing a value corresponding to the one predetermined angle in the storage circuit as a value of the second data in association with the value of the measured first data.

The second data may be data correlated with the relative angle between the body and the arm, or other data calculated in accordance with the relative angle between the body and the arm (e.g., data correlated to a liquid level of fuel).

In this manufacturing method, the value of the first data outputted by the angle sensor is measured with the relative angle between the body and the arm being set to a predetermined angle. This enables a discrepancy (i.e., detection error) between an actual relative angle between the body and the arm and the first data outputted by the angle sensor to be identified. Here, a value corresponding to the set predetermined angle is stored in the storage circuit as the value of the second data associated with the measured value of the first data. For example, when the first data outputted by the angle sensor indicates 10.5 degrees with the relative angle between the body and the arm being set to 10.0 degrees, the storage circuit is caused to store 10.0 degrees (or another value calculated based on 10.0 degrees (e.g., liquid level of fuel).), which is the actual relative angle, as the value of the second data associated with the first data being 10.5 degrees. Therefore, when the fuel amount detector is used thereafter and the first data outputted by the angle sensor indicates 10.5 degrees, the second data outputted by the data conversion circuit indicates 10.0 degrees (or the other value calculated based on 10.0 degrees). Since the value that is based on the actual relative angle is outputted as the second data, the remaining fuel amount can be detected more accurately. In this manufacturing method, the processing of storing the second data in association with the measured value of the first data is performed for at least three predetermined angles. This allows the conversion data to be created so as to correct the detection error even when the magnitude of the detection error of the angle sensor varies according to the relative angle as shown in FIG. 5. Therefore, this manufacturing method makes it possible to manufacture a fuel amount detector capable of accurately detecting a remaining amount of fuel even when a magnitude of a detection error of an angle sensor varies depending on a relative angle. Further, this manufacturing method creates the conversion data in accordance with a detection error that takes place in a fuel amount detector during the manufacturing thereof, thus the detection error can be corrected appropriately for each fuel amount detector. Therefore, it is possible to reduce variation in detection accuracy between individual fuel remaining amount detectors.

An embodiment described below includes a following features. It should be noted that the feature 1 is independent, and provides technical utility either independently or through various combinations.

(Feature 1) In manufacturing of a fuel supply module which comprises a fuel supply apparatus configured to supply fuel in a fuel tank to an external device and a fuel amount detector a body of which is fixed to the fuel supply apparatus, creating of conversion data disclosed herein may be performed. In this case, the creating of the conversion data may be performed with the body of the fuel amount detector being fixed to the fuel supply apparatus. The creating of the conversion data may include performing a processing for each of at least three predetermined heights, the processing including: measuring the value of the first data outputted by the angle sensor with the float being set to one of the at least three predetermined heights and storing a value proportional to the one predetermined height in the storage circuit as the value of the second data in association with the value of the measured first data. When the body of the fuel amount detector is mounted to the fuel supply apparatus, there may be installation error(s) in position and/or angle. By performing the creating of the conversion data with the body of the fuel amount detector being fixed to the fuel supply apparatus as described above, since the conversion data can be created so as to correct the installation error(s), the detection accuracy of the fuel amount detector can be further improved.

(Feature 2) A magnet may be fixed to the arm, and the angle sensor may be configured to detect the relative angle between the arm and the body based on a change in a magnetic field caused by rotation of the magnet.

BRIEF DESCRIPTION OF DRAWINGS

FIG. 6 is a diagram showing a relationship between an actual height $H_0$, the primary data $\theta_1$, and secondary data $H_1$ in a process of creating the conversion data.

FIG. 7 is a diagram showing a relationship between the actual angle $\theta_0$, the primary data $\theta_1$, and the secondary data $\theta_2$ in the process of creating the conversion data.

DETAILED DESCRIPTION

Figure 1:
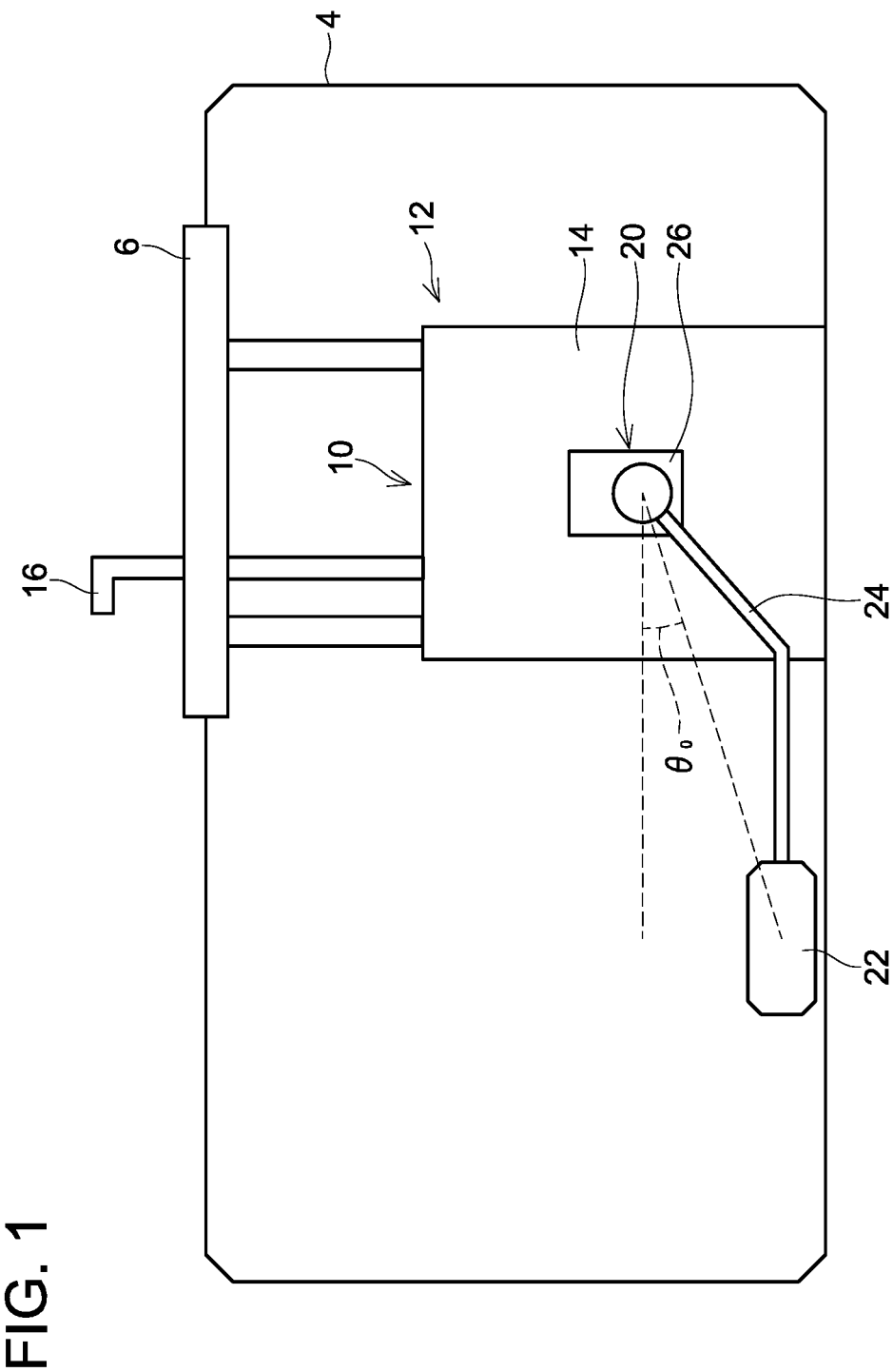
FIG. 1 is a side view of a fuel supply module 10 of an embodiment.

A fuel supply module 10 shown in FIG. 1 is disposed in a fuel tank 4 of a vehicle such as an automobile. The fuel supply module 10 supplies fuel in the fuel tank 4 to an internal combustion engine (not shown).

The fuel supply module 10 comprises a fuel supply apparatus 12 and a fuel remaining amount detector 20. The fuel supply apparatus 12 is accommodated in the fuel tank 4. The fuel supply apparatus 12 is attached to a setting plate 6 which closes an opening of the fuel tank 4. The fuel supply apparatus 12 includes a reservoir cup 14, a fuel pump (not shown) accommodated in the reservoir cup 14, and the like. The fuel in the fuel tank 4 is sucked into the reservoir cup 14. The fuel in the reservoir cup 14 is fed by a fuel pump through a discharge port 16 to the internal combustion engine (not shown).

Figure 2:
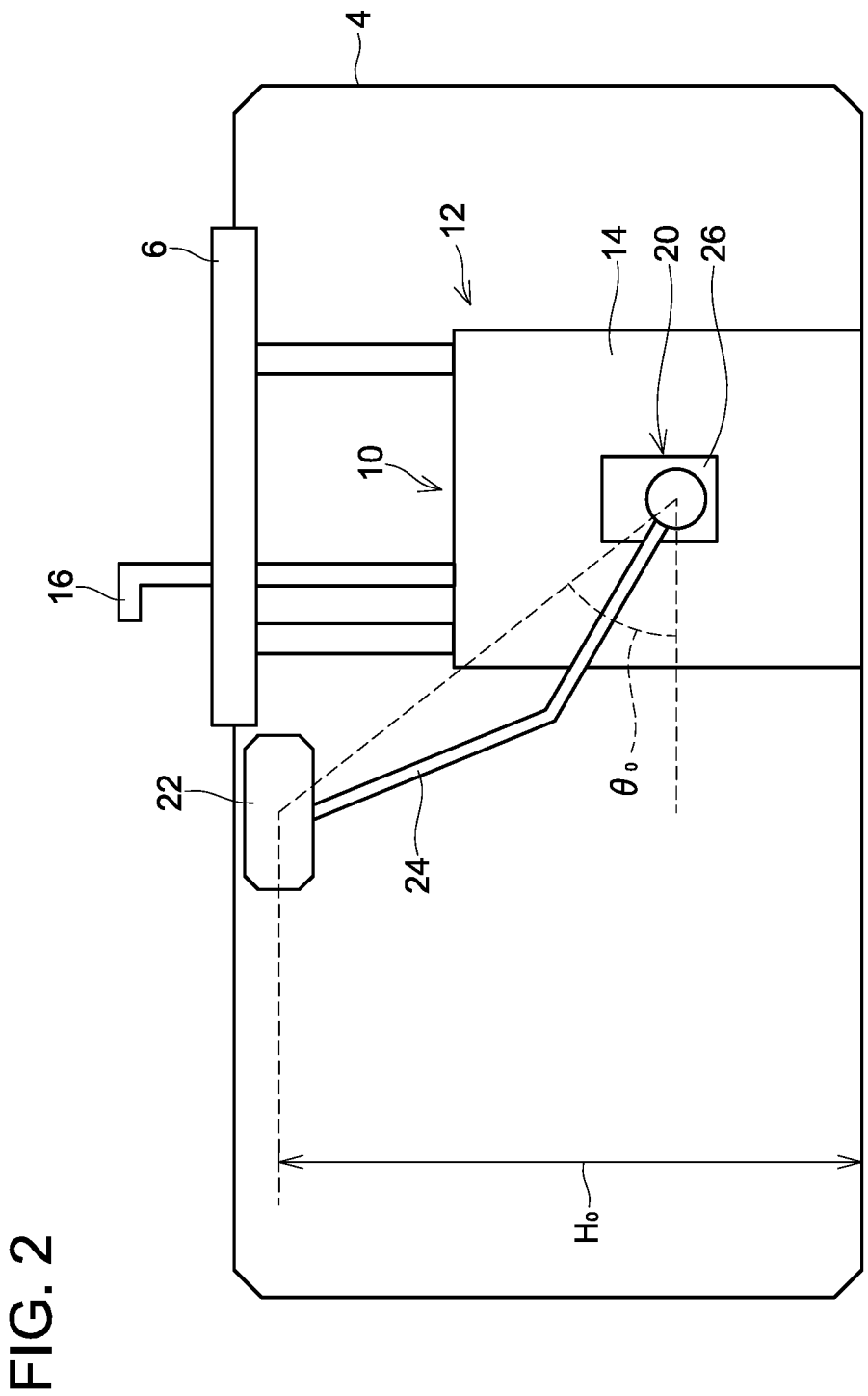
FIG. 2 is a side view of the fuel supply module 10 of the embodiment.

The fuel remaining amount detector 20 is attached to an outer side surface of the reservoir cup 14 in the fuel tank 4. The fuel remaining amount detector 20 includes a float 22, an arm 24, and a body 26. The float 22 floats on the fuel in the fuel tank 4. FIG. 1 shows a state in which the fuel in the fuel tank 4 is substantially empty. FIG. 2 shows a state where the fuel in the fuel tank 4 is substantially full. As shown in FIGS. 1 and 2, the float 22 moves in a vertical direction according to a liquid level of the fuel. The float 22 is rotatably attached to a distal end of the arm 24. A proximal end of the arm 24 is supported by the body 26. The arm 24 is rotatably supported with respect to the body 26. The body 26 is fixed to the outer side surface of the reservoir cup 14. When the float 22 ascends and descends in accordance with a height of the liquid level of the fuel in the fuel tank 4, the arm 24 rotates, swinging with respect to the body 26. That is, the arm 24 converts the vertical movement of the float 22 into a rotational movement. The arm 24 is constituted of a metal having resistance to the fuel, such as stainless steel, and has a cylindrical rod shape.

Although these are not shown, a magnet and a magnetic sensor are disposed inside the body 26. The magnet is fixed to the proximal end of the arm 24 within the body 26. The magnetic sensor is fixed to the body 26 within the body 26. As the arm 24 rotates, the magnet rotates with the arm 24. This causes the magnet to rotate relative to the magnetic sensor. The rotation of the magnet changes magnetic field passing through the magnetic sensor. The magnetic sensor detects a rotation angle of the magnet by detecting a change in the magnetic field. That is, the magnetic sensor detects a relative angle between the arm 24 and the body 26. The angle $\theta_0$ in FIGS. 1 and 2 indicates an angle between a horizontal plane and a direction from a rotation axis of the arm 24 toward a center of the float 22. That is, the angle $\theta_0$ corresponds to the relative angle between the body 26 and the arm 24. The magnetic sensor detects the angle $\theta_0$ and outputs data (hereinafter referred to as primary data $\theta_1$) indicating that detected value. However, as will be described later in detail, a detection error may occur between the primary data $\theta_1$ and the angle $\theta_0$.

Figure 3:
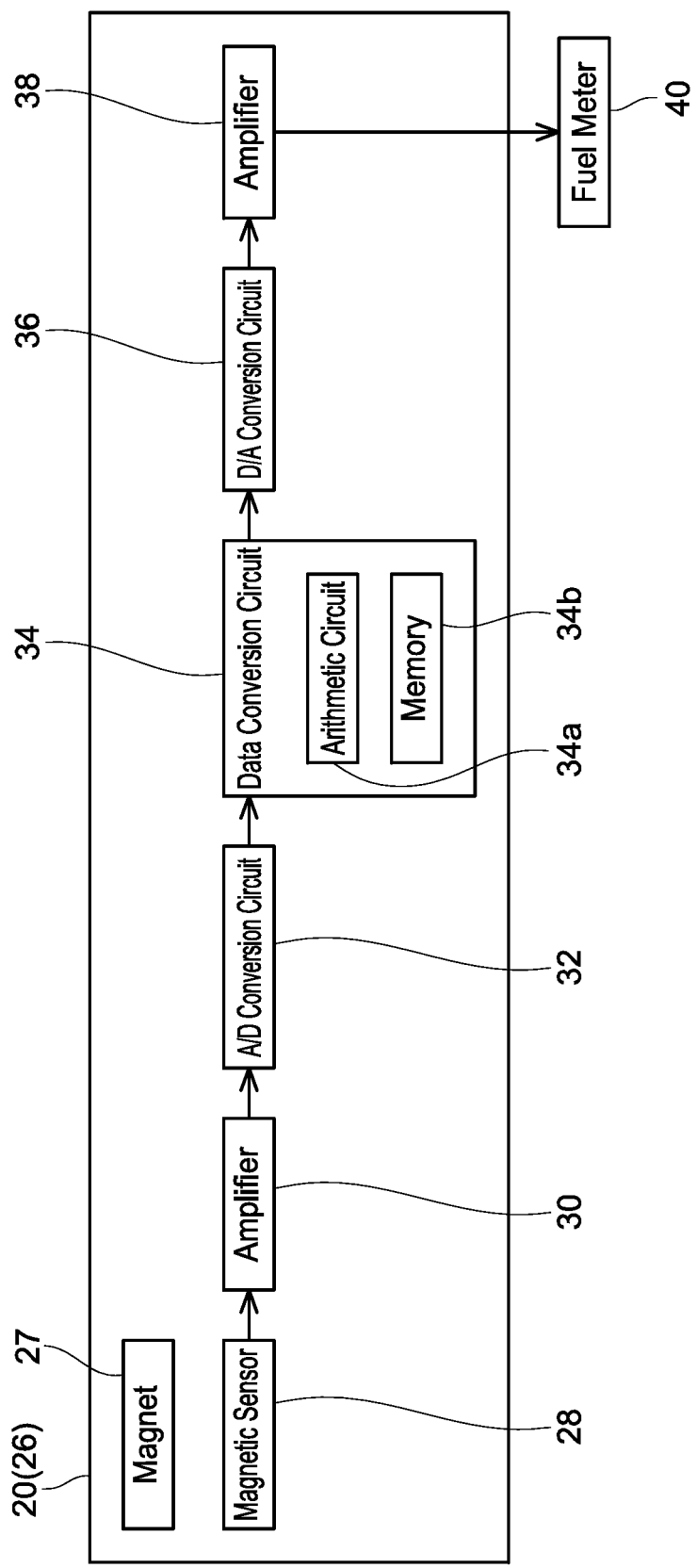
FIG. 3 is a block diagram of a fuel remaining amount detector 20.
Figures 4, 5:
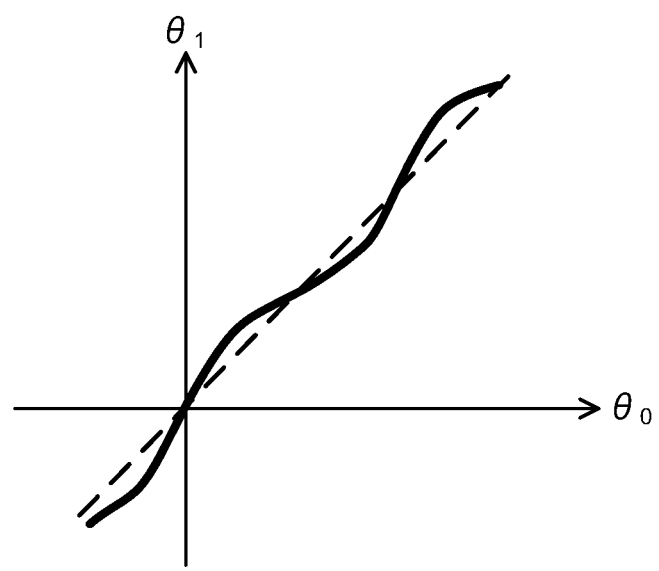
FIG. 4 is a diagram showing conversion data.
FIG. 5 is a graph showing a discrepancy between an angle $\theta_0$ and primary data $\theta_1$.

As shown in FIG. 3, in addition to the aforementioned magnet (a magnet 27) and magnetic sensor (a magnetic sensor 28), an amplifier 30, an A/D conversion circuit 32, a data conversion circuit 34, a D/A conversion circuit 36, and an amplifier 38 are disposed within the body 26 of the fuel remaining amount detector 20. Further, a fuel meter 40 in FIG. 3 indicates a fuel meter (fuel meter installed on a vehicle dashboard or the like) installed outside the fuel tank 4. The amplifier 30 receives an analog signal indicating the primary data $\theta_1$ from the magnetic sensor 28. The amplifier 30 amplifies the received analog signal and transmits the amplified analog signal to the A/D conversion circuit 32. The A/D conversion circuit 32 converts the received analog signal into a digital signal, and transmits the converted digital signal to the data conversion circuit 34. The data conversion circuit 34 includes an arithmetic circuit 34a and a memory 34b. The memory 34b stores conversion data shown in FIG. 4. The conversion data is data for converting the primary data $\theta_1$ into secondary data $H_1$. When the arithmetic circuit 34a receives the digital signal from the A/D conversion circuit 32, the arithmetic circuit 34a converts the primary data $\theta_1$ indicated by the digital signal into the secondary data $H_1$ based on the conversion data stored in the memory 34b. The arithmetic circuit 34a transmits a digital signal indicating the converted secondary data $H_1$ to the D/A conversion circuit 36. It should be noted that, the secondary data $H_1$, which will be described later in detail, is data indicating a height $H_0$ (see FIG. 2) of the float 22. As shown in FIG. 4, for example, the arithmetic circuit 34a outputs "0.0" as the secondary data $H_1$ when the primary data $\theta_1$ is "−22", outputs "2.5" as the secondary data $H_1$ when the primary data $\theta_1$ is "−14", and outputs "5.1" as the secondary data $H_1$ when the primary data $\theta_1$ is "0". If the received primary data $\theta_1$ does not match the primary data $\theta_1$ in the conversion data, the arithmetic circuit 34a refers to a value closest to the received primary data $\theta_1$. For example, when the received primary data $\theta_1$ is "−20", the arithmetic circuit 34a refers to "−22" in the primary data $\theta_1$ of the conversion table and outputs "0.0" as the secondary data $H_1$. Alternatively, the arithmetic circuit 34a may calculate a value (for example, "0.6") of the secondary data $H_1$ which is associated with the value "−20" of the received primary data $\theta_1$ based on a relationship between the primary data $\theta_1$ and the secondary data $H_1$ shown in FIG. 4. The D/A conversion circuit 36 shown in FIG. 3 converts the digital signal received from the arithmetic circuit 34a into an analog signal, and transmits the converted analog signal to the amplifier 38. The amplifier 38 amplifies the received analog signal and transmits the amplified analog signal to the fuel meter 40. The fuel meter 40 displays a remaining amount of fuel in accordance with the secondary data $H_1$ indicated by the received analog signal.

Next, a discrepancy between the angle $\theta_0$ and the primary data $\theta_1$ will be described. FIG. 5 shows a relationship between the angle $\theta_0$ and the primary data $\theta_1$. Note that a broken line graph in FIG. 5 indicates a design value, and a solid line graph in FIG. 5 indicates an actual measured value. As shown in the broken line graph of FIG. 5, the fuel remaining amount detector 20 is designed so that the primary data $\theta_1$ outputted by the magnetic sensor 28 is proportional to the angle $\theta_0$. However, due to manufacturing error(s), a positional offset (misalignment) may occur between the rotation axis of the arm 24 (i.e., a rotation axis of the magnet 27) and an axis of the magnetic sensor 28. Then, as shown by the solid line graph in FIG. 5, the primary data $\theta_1$ outputted by the magnetic sensor 28 offsets from the design value. An amount of the offset of the primary data $\theta_1$ outputted by the magnetic sensor 28 from the design value varies according to the angle $\theta_0$. There is a case where, depending on the angle $\theta_0$, the primary data $\theta_1$ may offset to a plus side with respect to the design value, and the primary data $\theta_1$ may offset to a minus side with respect to the design value. Also, there is a case where the primary data $\theta_1$ may offset from the design value due to positional and/or angular offset that take place when the fuel remaining amount detector 20 is fixed to the reservoir cup 14.

The height $H_0$ of the float 22 shown in FIG. 2 represents the liquid level of the fuel in the fuel tank 4. The height $H_0$ is proportional to sine of the angle $\theta_0$. More specifically, a relationship $H_0 = A \sin \theta_0 + B$ (where the symbol A denotes a length from the rotation axis of the arm 24 to the center of the float 22, and the symbol B denotes a height from a bottom surface of the fuel tank 4 to the rotation axis of the arm 24) holds. As described above, the primary data $\theta_1$ outputted by the magnetic sensor 28 has a discrepancy with respect to the angle $\theta_0$. Therefore, when the liquid level of the fuel (i.e., the height $H_0$ of the float 22) is calculated based on the primary data $\theta_1$, the liquid level of the fuel cannot be accurately detected.

The discrepancy (offset) of the primary data $\theta_1$ from the design value described with reference to FIG. 5 is different between respective fuel remaining amount detectors 20. That is, FIG. 5 shows a detection error (i.e., the discrepancy of the primary data $\theta_1$ from the design value) of a specific fuel remaining amount detector 20, while another fuel remaining amount detector 20 has a detection error having a distribution different from that of FIG. 5. Therefore, a common calculation formula for correcting the detection error is not applicable to all the manufactured fuel remaining amount detectors 20.

A method of manufacturing a fuel supply module 10 configured capable of correcting a detection error of the primary data $\theta_1$ as aforementioned will be described. The method of manufacturing the fuel supply module 10 disclosed herein has a characteristic feature about a process of creating conversion data, thus the conversion data creating process will be described in detail below.

A fuel remaining amount detector 20 (i.e., an uncompleted fuel remaining amount detector 20 before its completion) which does not store the conversion data in the memory 34b is prepared. As shown in FIGS. 1 and 2, the body 26 of the uncompleted fuel remaining amount detector 20 is fixed to the outer side surface of the reservoir cup 14, and then the conversion data creating process is performed. The conversion data creating process includes performing a processing which includes: fixing the height $H_0$ of the float 22 and then measuring the primary data $\theta_1$ outputted by the magnetic sensor 28; and storing a set of the measured primary data $\theta_1$ and secondary data $H_1$ indicating the height $H_0$ (or a value proportional to the height $H_0$) in the memory 34b. This processing is performed a plurality of times with the height $H_0$ being changed for each time. As a result, the conversion data is created as shown in FIG. 4. FIG. 6 shows a relationship between the height $H_0$, the angle $\theta_0$, the primary data $\theta_1$, and the secondary data $H_1$ when the conversion data of FIG. 4 is created. The process of creating the conversion data will be described below with reference to FIG. 6.

Firstly, the height $H_0$ is set to 0.0 cm. The angle $\theta_0$ at this time is approximately −20 degrees. Although the angle $\theta_0$ is shown in FIG. 6, it is not necessary to measure the angle $\theta_0$ during the conversion data creating process. When the height $H_0$ is set to 0.0 cm, the primary data $\theta_1$ (=−22) outputted by the magnetic sensor 28 is then measured. Next, the measured primary data $\theta_1$ (=−22) is stored in the memory 34b, and the height $H_0$ (or a value proportional to the height $H_0$) is stored in the memory 34b as the secondary data $H_1$ (=0.0) in association with the primary data $\theta_1$. This allows the primary data $\theta_1$ (=−22) and the secondary data $H_1$ (=0.0) to be stored in the memory 34b in association with each other. Next, the float 22 is moved to a position where the height $H_0$ is 2.5 cm. The angle $\theta_0$ is approximately −10 degrees when the height $H_0$ is 2.5 cm. Next, with the height $H_0$ set to 2.5 cm, the primary data $\theta_1$ (=−14) outputted by the magnetic sensor 28 is measured. Next, the measured primary data $\theta_1$ (=−14) is stored in the memory 34b, and the height $H_0$ (or a value proportional to the height $H_0$) is stored in the memory 34b as the secondary data $H_1$ (=2.5) in association with the primary data $\theta_1$. This allows the primary data $\theta_1$ (=−14) and the secondary data $H_1$ (=2.5) to be stored in the memory 34b in association with each other. Next, the float 22 is moved to a position where the height $H_0$ is 5.1 cm. The angle $\theta_0$ is approximately 0 degrees when the height $H_0$ is 5.1 cm. Next, with the height $H_0$ set to 5.1 cm, the primary data $\theta_1$ (=0) outputted by the magnetic sensor 28 is measured. Next, the measured primary data $\theta_1$ (=0) is stored in the memory 34b, and the height $H_0$ (or a value proportional to the height $H_0$) is stored in the memory 34b as the secondary data $H_1$ (=5.1) in association with the primary data $\theta_1$. This allows the primary data $\theta_1$ (=0) and the secondary data $H_1$ (=5.1) to be stored in the memory 34b in association with each other. Such processing is repeatedly performed by changing the height $H_0$ within a range of the height $H_0$=0.0 to 18.1 cm. Thus, the conversion data shown in FIG. 4 is created.

By storing the conversion data in the memory 34b, the manufacturing of the fuel remaining amount detector 20 (alternatively, the fuel supply module 10) is completed.

As described above, the conversion data is created in the manufacturing process, and the data conversion circuit 34 converts the primary data $\theta_1$ into the secondary data $H_1$ based on the conversion data, by which the detection accuracy of the remaining amount of fuel is improved. Details will be described below.

As described with reference to FIG. 5, the primary data $\theta_1$ outputted by the magnetic sensor 28 includes a discrepancy with respect to the actual angle $\theta_0$. Therefore, as shown in FIG. 6, a discrepancy occurs between the actual angle $\theta_0$ and the primary data $\theta_1$ in the conversion data creating process. In the conversion data creating process, the secondary data $H_1$ that is proportional to the actual height $H_0$ is stored in the memory 34b in association with the primary data $\theta_1$ including the discrepancy. After completion of the fuel remaining amount detector 20, upon receiving the primary data $\theta_1$ from the magnetic sensor 28, the arithmetic circuit 34a reads the secondary data $H_1$ associated with the received primary data $\theta_1$ from the memory 34b and outputs the read secondary data $H_1$. For example, as shown in FIG. 6, if the received primary data $\theta_1$ is "−22", "0.0" is outputted as the secondary data; if the received primary data $\theta_1$ is "−14", "2.5" is outputted as the secondary data $H_1$; and if the received primary data $\theta_1$ is "0", "5.1" is outputted as the secondary data $H_1$. That is, if the primary data $\theta_1$ is "−22", a value (0.0) proportional to the value (0.0 cm) of the actual height $H_0$ is outputted as the secondary data $H_1$; if the primary data $\theta_1$ is "−14", a value (2.5) proportional to the value (2.5 cm) of the actual height $H_0$ is outputted as the secondary data $H_1$; and if the primary data $\theta_1$ is "0", a value (5.1) proportional to the value (5.1 cm) of the actual height $H_0$ is outputted as the secondary data $H_1$. That is, in the fuel remaining amount detector 20, even if a detection error exists between the actual angle $\theta_0$ and the primary data $\theta_1$, the secondary data $H_1$ that is proportional to the value of the actual height $H_0$ when the primary data $\theta_1$ was measured is outputted by the arithmetic circuit 34a. This cancels influence of the discrepancy of the primary data $\theta_1$ when the arithmetic circuit 34a converts the primary data $\theta_1$ into the secondary data $H_1$. Therefore, the fuel remaining amount detector 20 allows to output the secondary data $H_1$ proportional to the actual liquid level ($H_0$) of the fuel, and to accurately detect the liquid level of the fuel. The fuel meter 40 can accurately display the remaining amount of the fuel based on the secondary data $H_1$.

As described above, the magnitude of the discrepancy between the primary data $\theta_1$ and the angle $\theta_0$ varies according to the angle $\theta_0$. As shown in FIGS. 4 and 6, by storing the primary data $\theta_1$ and the secondary data $H_1$ at at least three or more heights $H_0$, the discrepancy can be accurately corrected even when the discrepancy makes intricate changes according to the angle $\theta_0$. Further, as described above, the discrepancy between the primary data $\theta_1$ and the angle $\theta_0$ is different between the respective fuel remaining amount detectors 20. Therefore, by carrying out the conversion data creating process for each fuel remaining amount detector 20, the detection error can be corrected suitably in accordance with the detection error of each fuel remaining amount detector 20. By carrying out the conversion data creation process for each fuel remaining amount detector 20, variation in the detection accuracy of the fuel remaining amount detectors 20 can be reduced. The manufacturing method disclosed in the present specification allows to mass-produce the fuel remaining amount detectors 20 having a high detection accuracy.

In the embodiment described above, the conversion data creating process is performed after the body 26 has been fixed to the reservoir cup 14. This allows discrepancie(s) due to positional and/or angular offset (misalignment) that take place when the body 26 is attached to the reservoir cup 14 also to be corrected by the conversion data. This can further improve the detection accuracy of the fuel remaining amount detector 20. However, if the positional and/or the angular misalignment at the time of attachment does not pose a significant problem, the conversion data creating process may be performed before the body 26 is attached to the reservoir cup 14.

In the above embodiment, the arithmetic circuit 34a outputs the secondary data $H_1$ proportional to the height $H_0$ of the float 22. However, as shown in FIG. 7, the arithmetic circuit 34a may output the secondary data $\theta_2$ proportional to the angle $\theta_0$. In this case, the conversion data creating process may be performed while changing the angle $\theta_0$, and a value proportional to the angle $\theta_0$ may be stored in the memory 34b as the secondary data $\theta_2$. This configuration enables the arithmetic circuit 34a to correct the primary data $\theta_1$ and output the secondary data $\theta_2$ accurately proportional to the angle $\theta_0$. In this case, by separately providing a circuit configured to convert the secondary data $\theta_2$ into a value indicating a liquid level of fuel on a downstream (output) side (e.g., within the fuel meter 40) from the data conversion circuit 34, the fuel meter 40 is able to display an accurate remaining amount of the fuel.

In the above embodiment, the fuel liquid level is displayed by the fuel meter 40. However, there may be a case where, if a shape of the fuel tank 4 is complicated, the liquid level of the fuel and a volume of the remaining fuel do not become accurately proportional to each other. Therefore, the fuel meter 40 may display the volume of the remaining fuel. In this case, the conversion data may be configured so that the secondary data is proportional to the volume of the remaining fuel, and/or a circuit configured to convert the secondary data into a value indicating the volume of the remaining fuel may be provided on the downstream (output) side from the data conversion circuit 34.

Further, in the above embodiment, the fuel remaining amount detector 20 of a type configured to detect an angle based on magnetic change is described, but the technology disclosed herein may be applied to a fuel remaining amount detector of a type configured to detect an angle by another method.

While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

The invention claimed is:

1. A method of manufacturing a fuel remaining amount detector configured to detect a remaining amount of fuel in a fuel tank,
   wherein the fuel amount detector comprises:
   a body;
   an arm supported rotatably to the body;
   a float connected to the arm;
   an angle sensor configured to output first data in accordance with a relative angle between the body and the arm;
   a storage circuit configured to store conversion data which describes each value of second data in association with a value of the first data; and
   a data conversion circuit configured to receive the first data from the angle sensor, convert the first data received from the angle sensor to the second data based on the conversion data, and output the converted second data, the method comprising creating the conversion data by performing processing for each of at least three predetermined angles, wherein the processing includes measuring a value of the first data outputted by the angle sensor with the relative angle being set to one of the at least three predetermined angles, and storing a value corresponding to the one predetermined angle in the storage circuit as a value of the second data in association with the value of the measured first data.

2. A method of manufacturing a fuel supply module, wherein the fuel supply module comprises a fuel supply apparatus and the fuel amount detector manufactured by the method of claim 1, wherein the fuel supply apparatus is configured to supply the fuel in the fuel tank to an external device, the method of manufacturing the fuel supply module comprising the creating of the conversion data, wherein the creating of the conversion data is performed with the body being fixed to the fuel supply apparatus, the creating of the conversion data includes performing a processing for each of at least three predetermined heights, and the processing includes: measuring the value of the first data outputted by the angle sensor with the float being set to one of the at least three predetermined height; and storing a value proportional to the one predetermined height in the storage circuit as the value of the second data in association with the value of the measured first data.

* * * * *